Jan. 2, 1962 — J. S. HORNSTON — 3,015,418
POURING SPOUT
Filed July 9, 1958
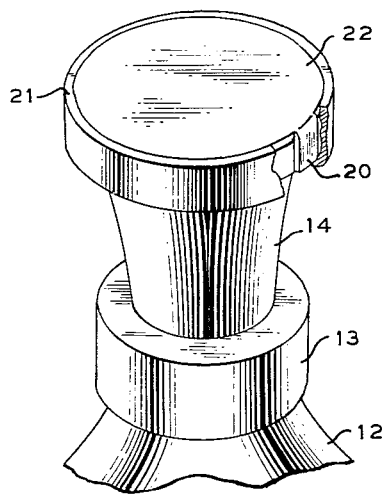
FIG. 1
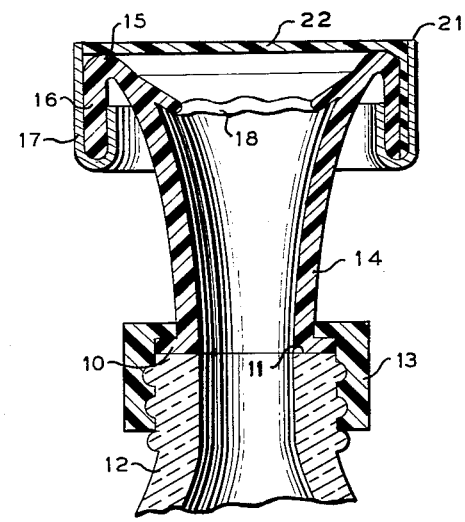
FIG. 2
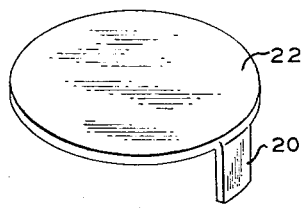
FIG. 3
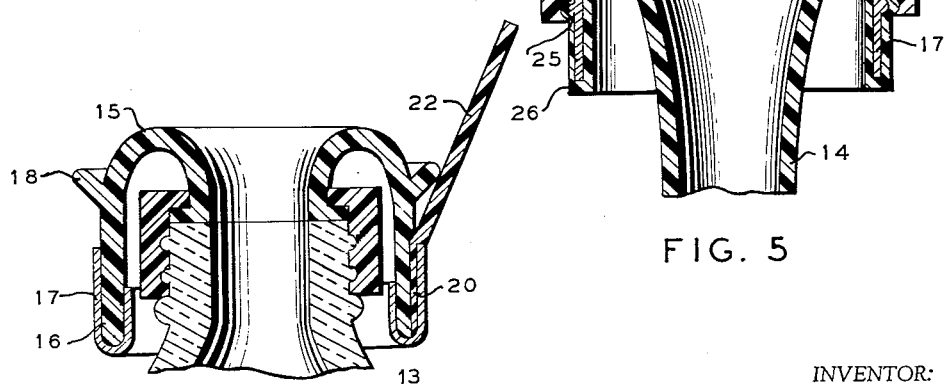
FIG. 4
FIG. 5
INVENTOR:
JOSEPH S. HORNSTON
BY:
ATTORNEY United States Patent Office 3,015,418
Patented Jan. 2, 1962

3,015,418
POURING SPOUT
Joseph S. Hornston, 1629 N. Columbia Place,
Decatur, Ga.
Filed July 9, 1958, Ser. No. 747,446
10 Claims. (Cl. 222—108)

This invention relates to a pouring spout, and more particularly concerns a spout for pouring vessels which prevents loss of liquid down the side of such vessels after the pouring operation has been completed.

One of the major problems relating to the dispensing of liquids, particularly those of relatively high viscosity such as syrups, is concerned with droplets of such liquids remaining on the pouring lip of the vessel. When such vessel is returned to its upright position, these droplets either harden on the pouring lip or run down the outside of the vessel resulting not only in an unsanitary condition of the external vessel surface but, as is often the case, staining the supporting surface or its covering.

It is one of the objects of the present invention, therefore, to overcome these and other problems known to the prior art by the provision of a pouring spout which is of such configuration that when the pouring vessel is reset to its upright position an annular trough is presented about the external periphery of the spout so as to preclude the passage of dripping fluids down the side of the vessel.

Another object of this invention is to provide a new and improved pouring spout for vessels which, upon a particular manipulation thereof, moves a fluid catching ridge to an external position about the periphery of the spout and by reverse manipulation thereof returns the fluid catching ridge to the interior of the spout while simultaneously causing a cover to position itself over the mouth thereof.

Still another object of this invention is to provide a new and improved pouring spout which can be selectively manipulated to move its pouring lip inside the mouth of the attachment so as to remove residue droplets of fluid to the interior of the spout.

A further object of this invention is to provide a new and improved pouring spout for vessels which is simple in construction and operation, and readily lends itself to the demands of economic manufacture.

Additional objects and advantages of this invention will become apparent from consideration of the following description taken in conjunction with the accompanying drawings wherein like designators refer to the same or similar parts throughout the several views, and in which:

FIG. 1 is a perspective view, partly broken away, showing one form of pouring spout according to my invention with its lid in closed position.

FIG. 2 is a vertical cross section of that form of pouring spout of my invention shown in FIG. 1.

FIG. 3 is a detail in perspective showing the dust lid and hinge flap of that form of pouring spout according to my invention shown in FIGS. 1 and 2.

FIG. 4 is a vertical cross section of the pouring spout of that form of the invention shown in FIGS. 1 and 2, with its lid in open position.

FIG. 5 is a vertical cross section of another embodiment of pouring spout according to my invention.

Referring now more particularly to the drawings, that form of the invention here shown by way of illustration may be characterized as a generally cylindrical tube of plastic or other flexible material, being formed at the base thereof with an annular flange 10 which is adapted to be retained in sealed relation against the upper lip 11 of a conventional pouring vessel 12 by cap 13 having a hole in the center thereof through which extends the neck 14 of the cylindrical tube. As shown more clearly in FIG. 2, neck 14 is formed with an upwardly increasing diameter and at its upper termination is everted so as to define an annular pouring lip 15 from which depends the outwardly return-folded annular rim 16. Rigid clamping collar 17 of generally U-shaped cross section is secured about the lower end of the return-folded rim 16, the outer surface of collar 17 being of such dimension as to be readily manipulatable vertically from the position shown in FIG. 2 to that in FIG. 4, for purposes as will hereinafter be seen. As viewed in FIG. 2, an annular ridge 18 is formed on the inside of neck 14 so as to define a downwardly opening trough. When collar 17 is manipulated to the position of FIG. 4, however, ridge 18 is everted to the outside of rim 16 where it defines an upwardly opening trough. Secured between clamping collar 17 and return-folded rim 16 is a resilient hinge flap 20 formed integrally with the dust lid 22 in such manner that the flap 20 and lid 22 always tend to assume a normal relation, as shown in FIG. 3. In the uppermost position of clamping collar 17, the outer edge 21 thereof extends above the pouring lip so as to form a recess for complementary reception of the cover lid 22.

In considering the operation of the foregoing construction, it will be seen that as the clamping collar is grasped by the operator and moved downwardly from the position of FIG. 2 to that of FIG. 4, return-folded rim 16 of the tubular body everts outwardly so that the annular ridge passes over the top of neck 14, with the result that in the lowermost position of the collar, about or adjacent the vessel cap 13, the ridge forms an upwardly opening trough configuration with the rim. It will be noted that such movement causes lid 22 of the spout to flip backwardly into a nonobstructing position. After liquid has been poured from the vessel and it is returned to its upright position, any liquid running down the neck or side of the vessel is caught by annular ridge 18 so as to prevent it from staining the supporting surface or cover thereof on which the vessel is set or otherwise creating an unsanitary surface on the vessel. After several such pourings, collar 17 may be manipulated to its uppermost position everting the pouring lip 15 and ridge 18 to their original internal positions so that the trough which is formed by ridge 18 opens downwardly into the interior of the vessel. In such manner, the spout is operative to effect return of such caught liquids so as to prevent waste and the development of unsanitary conditions.

Alternatively, the collar 17 may be moved upwardly after each pouring from the vessel so as to return the pouring lip to the interior of the neck along with any residue droplets of fluid thereon, making it unnecessary to rely on annular ridge 18 as above described. It will be noted that as that portion of the return-folded rim where the hinge member is secured under collar 17 reaches the extreme uppermost part of the spout, the lid of the spout is flipped over under force from the resilient hinge 20 so as to cover the mouth defined by the annular pouring lip.

FIG. 5 shows an alternate arrangement for closing the pouring spout of my invention. The rigid collar 17 is therein formed with external threads 25 and a depending flange 26 and imbedded in the return-folded rim rather than clamped thereabout. From this construction it can be seen that in the uppermost position of the collar 17 an internally threaded cap 28 may be screwed over the return-folded rim, with the depending flange 26 adapted to be grasped so as to permit tightening and loosening of the cap. With the cap 28 removed, however, the pouring spout is adapted to be manipulated in the same manner as heretofore described with respect to FIGS. 1, 2 and 3.

In the practice of the invention it will be recognized that the pouring spout may be made integral with the vessel, as would be desirable in certain applications, and that various other methods of attachment to the vessel could be utilized by those skilled in the art. It is also to be noted that actuation of the collar could be effected by a suitable linkage or spring-return arrangement as might be desirable in certain applications. It is also to be considered that while the neck 14 has been disclosed as cylindrical and with an upwardly increasing diameter that facilitates manipulation of collar 17, the invention is not to be limited thereto since a tube of constant diameter and of other configurations than cylindrical could be utilized within the framework of the basic inventive concept.

From the foregoing it will be apparent that I have provided a new and improved pouring spout for vessels which is well adapted to fulfill the aforestated objects of the invention. Moreover, whereas the invention has been disclosed in detail in respect to certain embodiments thereof which give satisfactory results, it will be understood by those skilled in the art to which this invention most nearly appertains, that additional embodiments and modifications thereof may be resorted to without departing from the spirit or scope of the invention as defined by the appended claims.

I claim:

1. A pouring spout for vessel comprising a flexible tubular body having a neck portion of circular cross section, said cross section being of generally increasing diameter toward one end of said neck portion and terminating in a peripheral pouring lip the other end of said body being secured to said vessel, said body being further formed at said one end with an everted portion defining an external return-folded rim outwardly of said vessel for forming a pouring lip on said spout when said spout is in its everted position, and means for annularly rigidizing a portion of said rim, said rigidized portion of said rim adapted to be manipulated so as to vary the position of said pouring lip in said tubular body.

2. A pouring spout for vessels comprising a flexible tubular body having an inner and outer end and forming when said tubular body is extended an external return-folded rim, a ridge projecting from said tubular body, said ridge being adjacent said outer end on said body such that upon movement of said outer end toward said inner end to a contracted position of said body said ridge defines an upwardly opening trough on the outside of said rim, and upon movement of said outer end away from said inner end to the extended position of said body said ridge defines a downwardly opening trough on the inside of said tubular body.

3. A pouring spout for vessels comprising a flexible tubular body of generally circular cross section and having an inner and outer end, said cross section being of generally increasing diameter toward said outer end of said body, said body being everted adjacent said outer end so as to form an annular return-folded rim when said body is extended, an annular ridge projecting from said tubular body, said annular ridge being adjacent said outer end and so positioned on said body such that upon movement of said body to a contracted position said ridge defines an upwardly opening trough on the outside of said rim, and upon movement of said body to its extended position said ridge defines a downwardly opening trough on the inside of said tubular body.

4. A pouring spout for vessels comprising a flexible tubular body having a neck portion, said neck portion terminating at one end in a peripheral pouring lip defining a mouth, said body being further formed at said one end with an everted portion defining an external return-folded rim, means for rigidizing a portion of said rim, said rigidized portion of said rim adapted to be manipulated so as to vary the position of said pouring lip in said tubular body, a cover for said mouth, and means responsive to manipulation of said rim for effecting movement of said cover.

5. A pouring spout for a vessel having an opening comprising a flexible tubular body, means mounting one end of the body to the opening of the vessel, said body extending outwardly from said vessel with the other end of said body disposed outermost, said tubular body flaring from said one end to said other end and adapted to be everted at said other end, forming a folded edge, said folded edge defining a transient peripheral pouring lip, and means adapted to manipulate said tubular body to evert said other end to define said transient pouring lip and return said tubular body to the initial configuration, whereupon said transient pouring lip reverts to being the surface of the inner wall of said tubular body.

6. A pouring spout as set forth in claim 5, wherein said means includes a clamping collar secured to said one end of said tubular body.

7. A pouring spout for vessel comprising a flexible tubular body having an outer end and an inner end and adapted to be everted when the outer end is passed back over the intermediate portion of said tubular body between the ends so as to form an external return-folded rim about said intermediate portion and transient lip therebetween, said outer end being movable when said tubular body is everted along said intermediate portion of said tubular body in opposite directions to define an extended position for said tubular body when said outer end is away from said inner end and a contracted position for said tubular body when said outer end is closer to said inner end, and a projecting ridge adjacent said outer end on said tubular body, said ridge defining a downwardly opening trough within said tubular body when said tubular body is in its extended position and an upwardly opening trough on the outside of said tubular body when said tubular body is in its contracted position.

8. A pouring spout for vessel comprising a flexible tubular body having an outer end and an inner end and adapted to be everted when the outer end is passed back over the intermediate portion of said tubular body between the ends so as to form an external return-folded rim about said intermediate portion and a transient lip therebetween, said outer end being movable when said tubular body is everted along said intermediate portion of said tubular body in opposite directions to define an extended position for said tubular body when said outer end is away from said inner end and a contracted position for said tubular body when said outer end is closer to said inner end, and a lid fixed to said outer end, said lid covering said transient lip when said tubular body is in its extended position and automatically uncovering said transient lip as said outer end is moved toward its position closer to said inner end.

9. A pouring spout for vessel comprising a flexible tubular body having an outer end and an inner end and adapted to be everted when the outer end is passed back over the intermediate portion of said tubular body between the ends so as to form an external return-folded rim about said intermediate portion and a transient lip therebetween, said outer end being movable when said tubular body is everted along said intermediate portion of said tubular body in opposite directions to define an extended position for said tubular body when said outer end is away from said inner end and a contracted position for said tubular body when said outer end is closer to said inner end, a projecting ridge adjacent said outer end on said tubular body, said ridge defining a downwardly opening trough within said tubular body when said tubular body is in its extended position and an upwardly opening trough on the outside of said tubular body when said tubular body is in its contracted position, and a lid fixed to said outer end, said lid covering said transient lip when said tubular body is in its extended position and automatically uncovering said transient lip as said outer end is moved toward its position closer to said inner end.

10. A pouring spout for vessel comprising a flexible tubular body having an outer end and an inner end and adapted to be everted when the outer end is passed back over the intermediate portion of said tubular body between the ends so as to form an external return-folded rim about said intermediate portion and a transient lip therebetween, said outer end being movable when said tubular body is everted along said intermediate portion of said tubular body in opposite directions to define an extended position for said tubular body when said outer end is away from said inner end and a contracted position for said tubular body when said outer end is closer to said inner end, a relatively rigid collar on said outer end, a resilient hinge flap connected to said collar, and a lid carried by said hinge flap, said lid covering said transient lip when said tubular body is in its extended position and automatically uncovering said lip as said outer end is moved toward its position closer to said inner end.

References Cited in the file of this patent

UNITED STATES PATENTS

| | | |
|---|---|---|
| 1,869,049 | Card | July 26, 1932 |
| 1,989,714 | Statham | Feb. 5, 1935 |
| 1,992,067 | Gunn | Feb. 19, 1935 |
| 2,561,596 | Rieke | July 24, 1951 |
| 2,601,039 | Livingstone | June 17, 1952 |
| 2,795,362 | Tamminga | June 11, 1957 |
| 2,898,018 | Borah | Aug. 4, 1959 |

FOREIGN PATENTS

| | | |
|---|---|---|
| 1,070,883 | France | Feb. 24, 1954 |